United States Patent [19]

Kassai

[11] Patent Number: 4,805,259
[45] Date of Patent: Feb. 21, 1989

[54] CASTER

[75] Inventor: Kenzou Kassai, Osaka, Japan

[73] Assignee: Aprica Kassai Kabushikikaisha, Osaka, Japan

[21] Appl. No.: 109,933

[22] Filed: Oct. 16, 1987

[30] Foreign Application Priority Data

Oct. 17, 1986 [JP] Japan .............................. 61-160009[U]
Nov. 21, 1986 [JP] Japan .................................. 61-279027

[51] Int. Cl.4 .............................................. B60B 33/00
[52] U.S. Cl. ..................................... 16/35 R; 188/1.12
[58] Field of Search ......................... 16/35 R; 188/1.12

[56] References Cited

U.S. PATENT DOCUMENTS

| 3,571,842 | 3/1971 | Fricke | 16/35 R |
| 4,349,937 | 9/1982 | Fontana | 16/35 R |
| 4,453,287 | 6/1984 | Kassai | 188/1.12 |

FOREIGN PATENT DOCUMENTS

| 2702211 | 9/1977 | Fed. Rep. of Germany | 16/35 R |
| 60-18406 | 1/1985 | Japan | 16/35 R |
| 2150826 | 7/1985 | United Kingdom | 16/35 R |

Primary Examiner—Richard K. Seidel
Attorney, Agent, or Firm—W. G. Fasse; D. H. Kane, Jr.

[57] ABSTRACT

A caster has a fixed bracket, a rotary yoke and a wheel. The rotary yoke includes a caster locking member adapted to engage the rotary yoke to inhibit its rotation, and a brake member adapted to engage the wheel to inhibit its rotation.

14 Claims, 7 Drawing Sheets they would be too sensitive to

CASTER

FIELD OF THE INVENTION

This invention relates to a caster attached to a movable body to make it easier for said body to change its direction of travel.

DESCRIPTION OF THE PRIOR ART

To facilitate changing the direction of travel, casters are often attached to a baby carriage or other conveying device or a target body to be moved. Among many conventional baby carriages is a type having the best operability in which the push rod can be switched between two states, one for the face-to-back push mode and the other for the face-to-face push mode, and in which the front wheels can be swiveled by casters. Such baby carriage is illustrated in FIG. 1.

The baby carriage 1 shown comprises a pair of front legs 3 disposed right and left and rotatably supporting front wheels 2 at their lower ends by an axle 6, a pair of rear legs 5 disposed right and left and rotatably supporting rear wheels 4 at their lower ends by an axle 7 and a push rod 10. The push rod 10 is turnably installed so that it can be switched between the face-to-back and face-to-face push modes. The position shown in solid lines in FIG. 1 corresponds to the face-to-back push mode of the push rod 10 in which the carriage moves from right-to-left in FIG. 1 and the position shown in phantom lines corresponds to the face-to-face push mode of the push rod 10 in which the carriage moves from left-to-right in FIG. 1.

Casters 8 are attached to the lower ends of the front legs 3. Each caster 8 is rotatable around an axis 9 of rotation and rotatably supports the front wheel 2 by the horizontal axle 6 at a position horizontally spaced from the axis 9 of rotation.

When the baby carriage 1 is pushed on a flat road in the face-to-back push mode from right-to-left, the axle 6 of the front wheels 2 is positioned rearwardly of the axis 9 of rotation of each caster 8 with respect to the direction of travel. When the direction of travel of the baby carriage 1 is changed, the casters 8 suitably swivel about the axis 9 to facilitate the change of direction. Thus, the provision of casters 8 improves the operability of the baby carriage 1.

Further, the baby carriage is commonly provided with a brake mechanism to inhibit the rotation of the rear wheels. In the baby carriage 1 shown in FIG. 1, such brake mechanism is associated with the rear wheels 4 not having any casters, said brake being operated by hand or by foot to inhibit the rotation of the rear wheels 4. However, the conventional baby carriage 1 of FIG. 1 has following problem.

The operation of switching the push rod 10 from the state shown in solid lines in FIG. 1 to the face-to-face push mode and moving the carriage will now be described. When the push rod 10 has been switched to the face-to-face push mode shown in phantom lines in FIG. 1 prior to moving the baby carriage in the face-to-face mode, the casters 8 swivel through 180 degrees until the front wheels 2 assume the position shown in phantom lines. In this state, the axle 6 of the front wheels 2 is positioned rearwardly of the axis 9 of rotation of each caster 8 with respect to the direction of travel. On the other hand, the rear wheels 4 now positioned forward with respect to the direction of travel cannot swivel. As a result, when the baby carriage 1 is moved in the face-to-face push mode from left-to-right, the change of direction cannot be effected so smoothly.

Further, since the brake mechanism for inhibiting the rotation of the wheels, is associated with the rear wheels which are now positioned forward with respect to the direction of travel, it is difficult or troublesome to brake the wheels when the baby carriage is being moved in the face-to-face push mode. To avoid such difficulty or trouble, the front wheels 2 could also be provided with a brake mechanism. However, since the front wheels 2 are swivelable, a very complicated mechanism would be needed if the front wheels are to be provided with a brake mechanism. For this reason, in baby carriages with casters, it has been common practice not to install a brake mechanism on wheels which are swivelable while installing such a brake mechanism on wheels which are not swivelable. As a result, the problem described above occurs when the baby carriage is moved in the face-to-face push mode from left-to-right in FIG. 1.

Further, even when the baby carriage 1 is moved in the face-to-back push mode from right-to-left as shown in solid lines in FIG. 1, it is preferable to inhibit the swivelling of the casters if the road is poor having a very irregular surface. The reason is that if the casters 8 are allowed to swivel, they would be too sensitive to surface irregularities on the road, so that it becomes hard of the baby carriage is degraded.

SUMMARY OF THE INVENTION

With the above in mind, the invention is intended to provide a caster which can be inhibited from swivelling and which can also inhibit the rotation of a wheel to function as a brake.

A caster according to the invention comprises a fixed bracket fixedly attached to a target body to be moved, e.g. a target body, a rotary yoke supported by said fixed bracket for rotation around a vertical axis, and a wheel rotatably supported by said rotary yoke through a horizontal axle at a position horizontally deviated from the axis of rotation of said rotary yoke, said rotary yoke including caster locking means adapted to engage said fixed bracket to inhibit the rotation of said rotary yoke and brake means adapted to engage said wheel to inhibit the rotation of said wheel.

Since the rotary yoke, which is a component of the caster, is provided with both caster locking means for inhibiting the rotation of said rotary yoke and brake means for inhibiting the rotation of the wheel, there is no need to provide corresponding mechanisms for a movable body to which said caster is attached. Thus, the construction of the entire movable body is simplified and is cost-effective.

A conventional caster, though provided with a mechanism for inhibiting the swivelling thereof, has not been provided with a mechanism for inhibiting the rotation of its wheel. In contrast to such conventional caster, the caster of the invention is provided with brake means in addition to caster locking means, so that its utility is greatly increased.

If casters according to this invention are installed, particularly, on both the front wheels and the rear wheels of a baby carriage, the advantages described above will be particularly effective.

FIGS. 2 and 3 are schematic views of a baby carriage having casters of the invention attached to the lower ends of the front and rear legs thereof. In FIG. 2, the baby carriage 11 is in the face-to-back push mode, and in FIG. 3 it is in the face-to-face push mode.

The lower ends of the front legs 13 of the baby carriage 11 have casters 18 attached thereto. Each caster 18 rotatably supports a front wheel 12 by an axle 16. The lower ends of the rear legs 15 have casters 21 attached thereto. Each caster 21 rotatably supports a rear wheel 14 by an axle 17. As shown, when a push rod 20 is in the face-to-back push mode, the axle 16 is positioned rearwardly of the axis of rotation 22 of the caster 21.

When the baby carriage 11 is moved in the state shown in FIG. 2, the change of direction can be smoothly effected and the operability of the baby carriage 11 enhanced if the front wheels 12 are allowed to swivel. However, if the rear wheels 14, in addition to the front wheels 14, are allowed to swivel, the casters 18 and 21 will be too sensitive to surface irregularities on the road, degrading the operability of the baby carriage 11, contrary to the expectation. In this case, the caster locking means for the casters 21 may be operated to inhibit the swivelling of said casters. When it is desired to brake the wheels, the brake means for the casters 21 which are positioned rearwardly with respect to the direction of travel, may be operated.

When it is desired to move the baby carriage in the face-to-face push mode as shown in FIG. 3, the casters 21 positioned forward with respect to the direction of travel are allowed to swivel while the casters 10 positioned rearward with respect to the direction of travel are inhibited from swivelling. In this manner, the change of direction of travel of the baby carriage 11 can be smoothly effected even in the face-to-face push mode. Further, when it is desired to brake the front wheels, the brake means for the casters 18 positioned rearward with respect to the direction of travel may be operated.

As described above, if casters of the invention are attached to the front and rear legs of a baby carriage, the operability of the baby carriage can be greatly enhanced as compared with the conventional baby carriage shown in FIG. 1.

In the above description, casters attached to a baby carriage have been exemplified; however, casters of the invention are not limited in application to baby carriages but are applicable to other movable bodies such as push carts, target bodies or the like.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
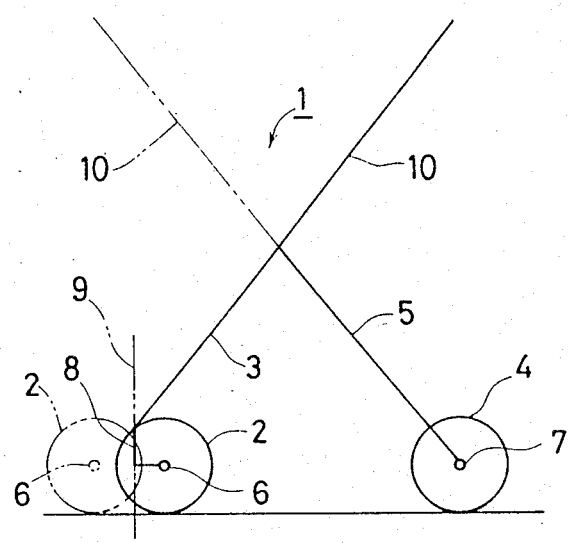
FIG. 1 is a schematic view of a conventional baby carriage in which the push rod can be switched between the face-to-back push mode and the face-to-face push mode and in which casters are attached to the lower ends of the front legs.
Figure 2:
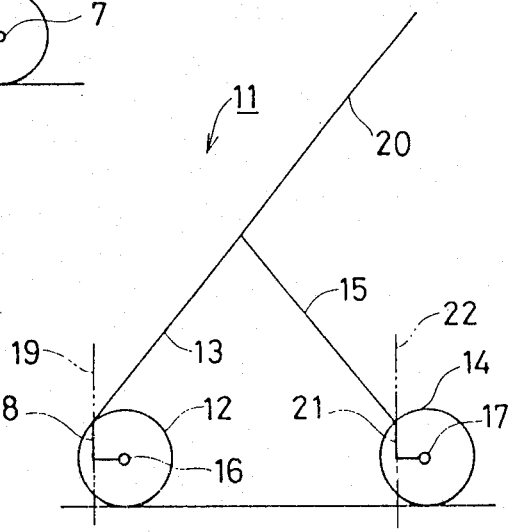
FIG. 2 is a schematic view of a baby carriage of the invention in which the push rod can be switched between the face-to-back push mode and the face-to-face push mode and in which casters are attached to the lower ends of the front and rear legs.
Figure 3:
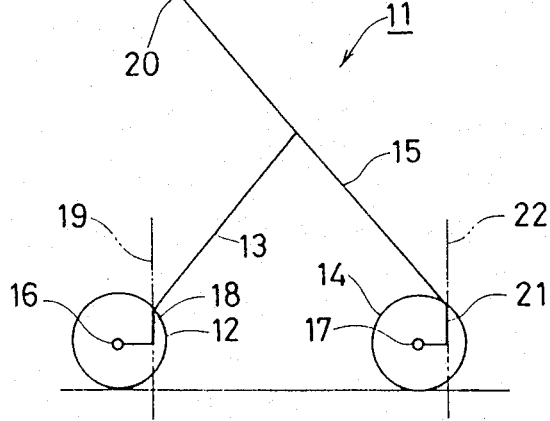
FIG. 3 is a schematic view showing the state of the push rod switched from the state of FIG. 2 to the face-to-face push mode.
Figure 4:
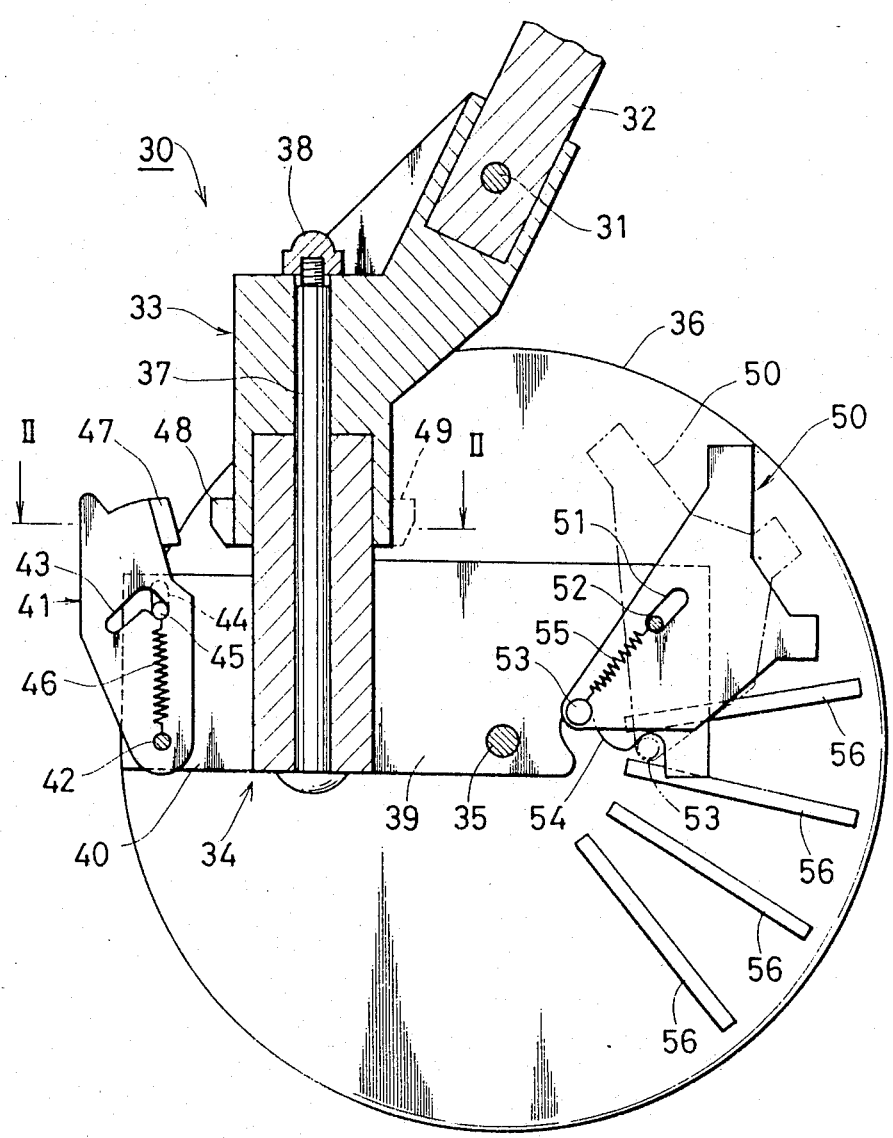
FIG. 4 is a front view, in section, showing a first embodiment of the invention attached to a front leg of a baby carriage.

Referring to FIG. 4, caster 30 comprises a fixed bracket 33 fixedly attached to a front leg 32 of a baby carriage by a pin 31, a rotary yoke 34 rotatably supported by said fixed bracket 33, and a wheel 36 rotatably supported on said rotary yoke 34 by a horizontal axle 35. A support shaft 37 extends vertically through the rotary yoke 34 and fixed bracket 33. A nut 38 is attached to the upper end of the support shaft 37 to prevent it from slipping off. In this manner, the rotary yoke 34, held on the support shaft 37, is rotatable relative to the fixed bracket 33.

The rotary yoke 34 rotatably held by the fixed bracket 33 is formed with a pair of rearwardly projecting walls 39 and a pair of forwardly projecting walls 40. A caster locking member 41 is installed between the forwardly projecting walls 40. The caster locking member 41 is rotatably attached at its lower end to the projecting walls 40 by a shaft 42.

As shown, each projecting wall 40 is formed with a vertically extending elongated opening 44 in the portion which overlaps the caster locking member 41. Correspondingly thereto, the caster locking member 41 is formed with an inverted V-shaped guide groove 43 in the portion which overlaps the elongated opening 44 in the rotary yoke 34. A pin 45 extends through the elongated opening 44 and guide groove 45. A tension spring 46 is connected between the pin 45 and the shaft 42, thereby urging the pin 45 downward.

Figure 5:
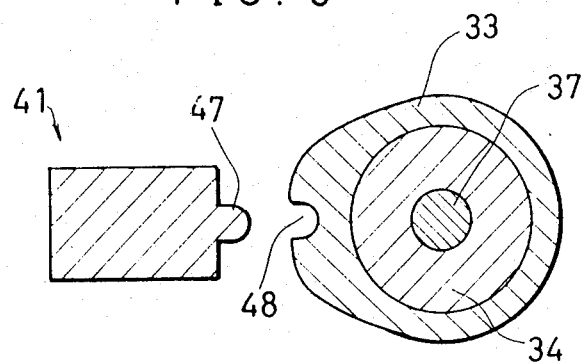
FIG. 5 is a sectional view taken along the line V—V in FIG. 4.

Referring to FIG. 5 showing an end view taken along the line V—V in FIG. 4, the front end of the caster locking member 41 is formed with an engaging convex portion 47. Correspondingly thereto, the fixed bracket 33 is formed with an engaging concave portion 48 for engagement with the engaging convex portion 47.

In the state shown in FIG. 4, the pin 45 is positioned at the right-hand end of the guide groove 43. In this case, the engaging convex portion 47 of the caster locking member 41 is not engaged with the engaging concave portion 48 of the fixed bracket 33. In this state, if the caster locking member 41 is operated by hand or by foot to turn it clockwise, the pin 45 is moved upward along the guide groove 43 against the force of the spring 46 until it is positioned at the left-hand end of the guide groove 43. In this state, the engaging convex portion 47 of the caster locking member 47 is engaged with the engaging concave portion 48 of the fixed bracket 33, with the result that the rotation of the rotary yoke 34 relative to the fixed bracket 33 is inhibited. This locked state can be canceled by operating the caster locking member 41 by hand or by foot to turn it counterclockwise as viewed in FIG. 4.

When the baby carriage is moved on a bad road, the caster locking member 41 is operated to lock the caster. In the illustrated embodiment, the fixed bracket 33 has been formed with only one engaging concave portion 48. However, as indicated by dotted lines in FIG. 4, if the fixed bracket 33 is formed with another engaging concave portion 49 at a position 180 degrees away from the engaging concave portion 48, the swivelling of the caster can be inhibited also at a position in which the rotary yoke 3 has been turned 180 degrees from the state shown in FIG. 4; thus, convenience is further promoted.

As shown, a brake member 50 is disposed between the rearwardly projecting walls 39 of the rotary yoke 34. The brake member 50 is operated by hand or by foot to be switched between a full line inoperative position and a dash-dotted brake effective position, so that when it is in a first position it engages the wheel 36 to inhibit the rotation of the wheel. As shown, the brake member 50 is formed with an elongated opening 51 which may extend vertically when the brake member 50 is in the dash-dotted brake effective position. Correspondingly thereto, the projecting walls 39 are fixedly provided with a shaft 52 extending through the elongated opening 51. The lower end portion of the brake member 50 has a brake rod 53 fixed thereto, said brake rod extending parallel by the axle 35.

To switch the brake member 50 between the above mentioned two positions, each projecting wall 39 is provided with a V-shaped guide groove 54 engageable by the brake rod 53. As shown, a tension spring 55 is connected between the brake rod 53 fixed to the lower end portion of the brake member 50 and the shaft 52 fixed to the projecting walls 39, thereby ensuring reliable engagement between the brake rod 53 and the guide groove 54.

In the illustrated state, the brake rod 53 of the brake member 50 is positioned at the left-hand end of the V-shaped guide groove 54 whereby the brake is not effective as such. If the brake member 50 is operated by hand or by foot to turn counterclockwise from the state shown, the brake rod 53 is guided along the guide groove 54 to move to the right and hence the brake member 50 is moved downward. Finally, the brake rod 53 is positioned at the right-hand end of the V-shaped guide groove 54, as shown in dash-dotted lines in FIG. 4. In this state, the brake rod 53 fits between two spokes of the wheel 36, thereby inhibiting the rotation of the wheel 36 so that the brake is effective as such.

When it is desired to cancel the brake effect on the wheel 36, the operation described above will be reversely performed.

When the caster is provided with the brake member 50 as described above, there is no need to provide the baby carriage body with means for inhibiting the rotation of the wheel, so that the practical value of the caster is enhanced.

The illustrated caster locking member 41 and brake member 50 are examples only. The caster locking member and brake member are not limited to the illustrated constructions; other forms may be contemplated. For the caster locking member, any construction or mechanism may be employed provided that it can be switched between two positions by hand or by foot and that when it is in one position it engages the fixed bracket to inhibit the rotation of the rotary yoke. Similarly, for the brake member, any construction or mechanism may be employed provided that it can be switched between two positions by hand or by foot and that when it is in one position it engages the wheel to inhibit the rotation of the wheel.

Figure 6:
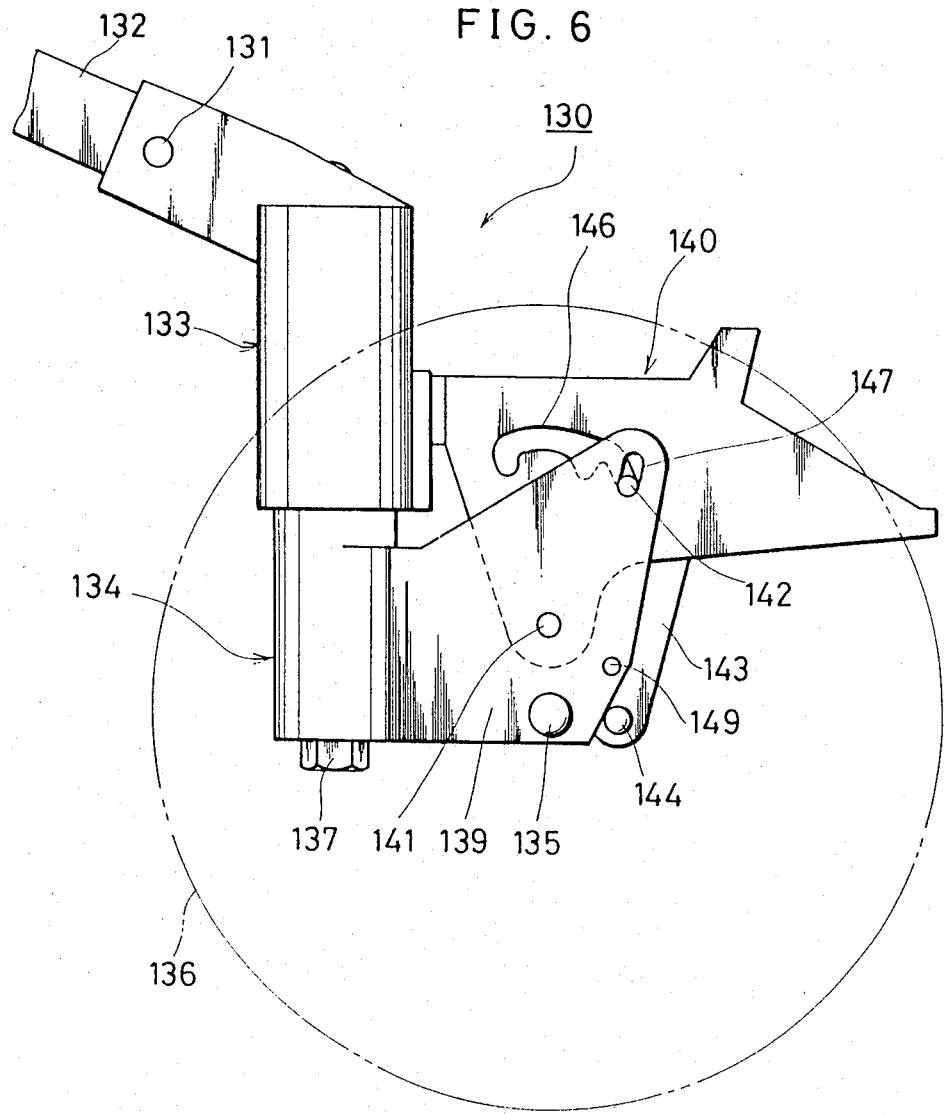
FIG. 6 is a front view of a second embodiment of the invention.
Figure 7:
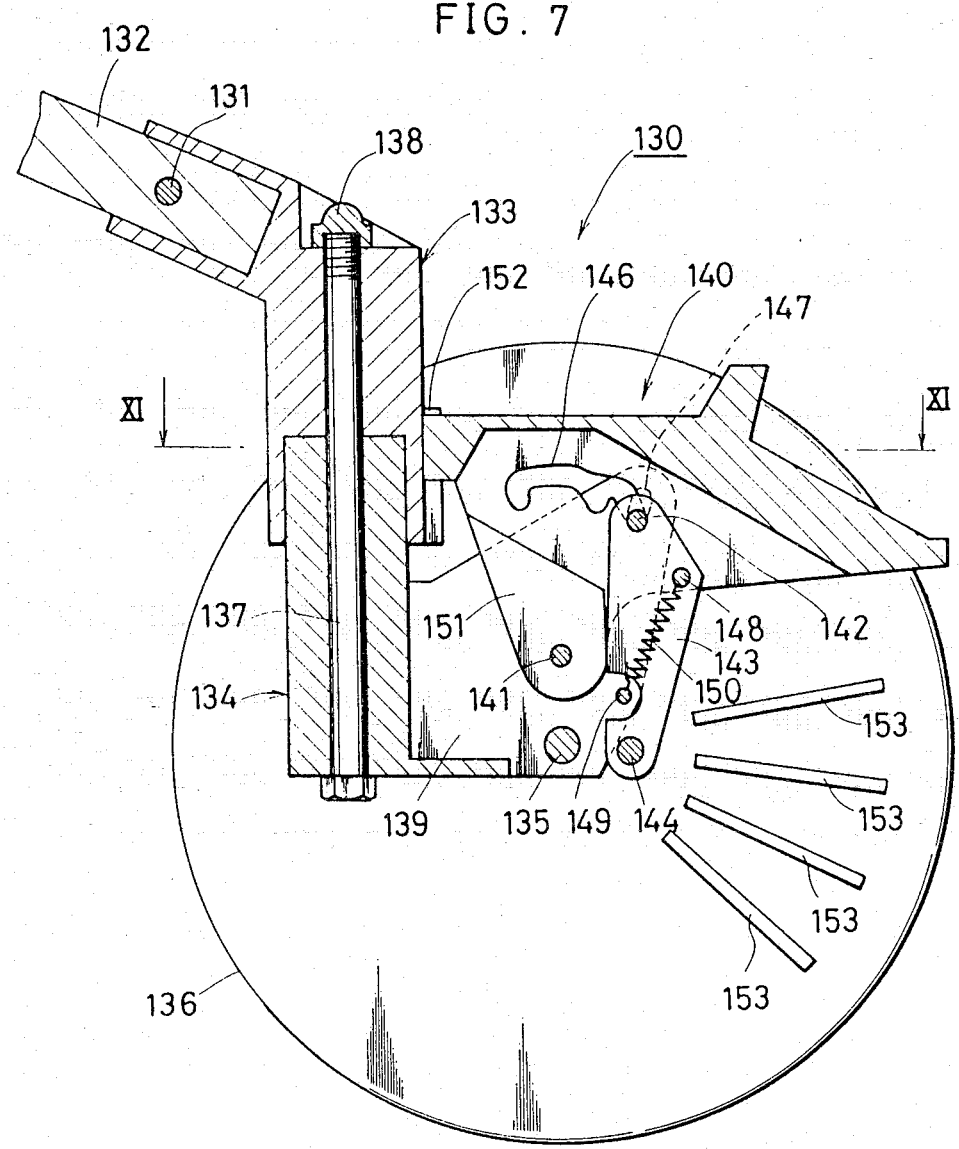
FIG. 7 is a front view, in section, of a caster shown in FIG. 6.

As shown in FIGS. 6 and 7, caster 130 comprises a fixed bracket 133 fixedly attached at its upper end to a rear leg 132 of a baby carriage by a pin 131, a rotary yoke 134 rotatably supported on said fixed bracket 133, and a wheel 136 rotatably supported on the rotary yoke 134 by a horizontal axle 135. A support shaft 137 extends vertically through the rotary yoke 134 and fixed bracket 133. A nut 138 is attached to the upper end portion of the support shaft 137, thereby preventing the support shaft 137 from slipping off. Thus, the yoke 134 is held for rotation on the support shaft 137, whereby, the rotary yoke 134 is rotatable relative to the fixed bracket 133.

The rotary yoke 134 rotatably supported on the fixed bracket 133, has a pair of rearwardly projecting walls 139. An operating pedal 140 and a brake member 143 are disposed between said projecting walls 143. The operation pedal 140 is rotatably attached at its lower end to the projecting walls 139 by a shaft 141.

Figure 8:
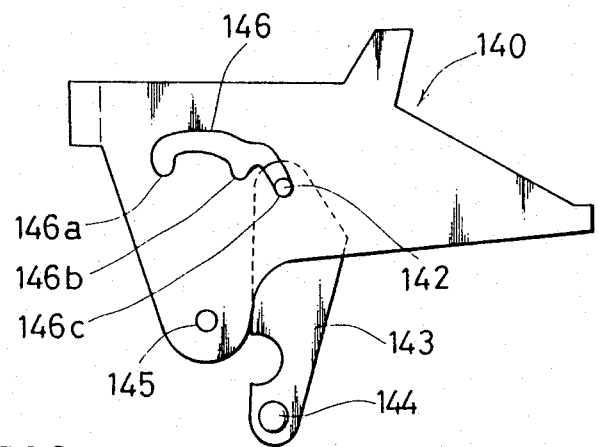
FIG. 8 is a front view of an operating pedal and a brake member shown in FIGS. 6 and 7.
Figure 9:
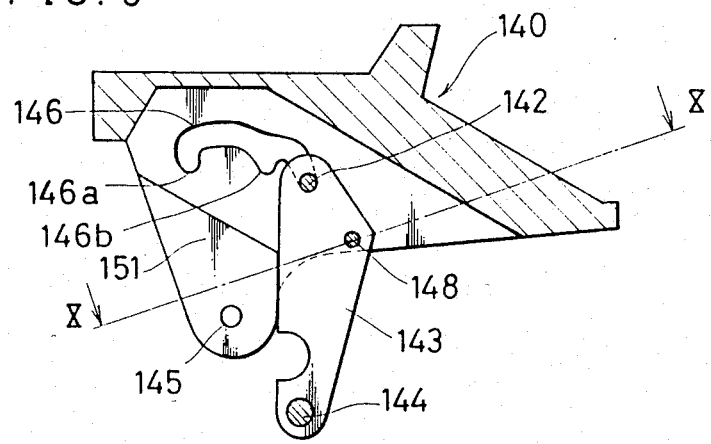
FIG. 9 is a sectional view corresponding to FIG. 8.
Figure 10:
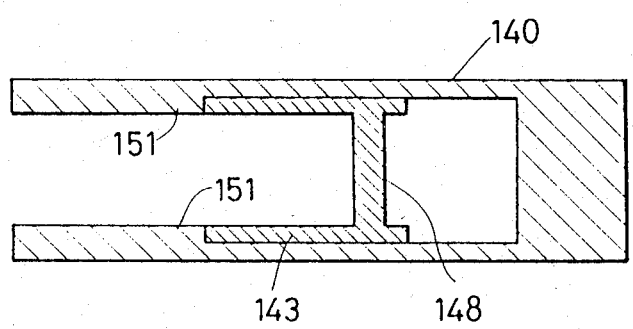
FIG. 10 is an end view taken along the line X—X in FIG. 9.

FIGS. 8, 9 and 10 show the operating pedal 140 and brake member 143. As shown, the operating pedal 140 has a guide groove 146 having three engaging concave portions 146a, 146b and 146c. A pin 142 extends through the guide groove 146. The brake member 143 is fixedly attached to the pin 142. The brake member 143 is turnable around the axis of the pin 142.

As shown in FIG. 10, the brake member 143 is positioned between the two parallel walls of the operating pedal 140. The inner wall surfaces of the two walls of the operating pedal 140 are formed with inwardly projecting abutment portions 151 which abut against the brake member 143. The brake member 143 is fixedly provided with a shaft 148. As shown in FIG. 7, the lower end of the brake member 143 is fixedly provided with a brake rod 144 extending parallel with the axle 135.

Referring to FIGS. 6 and 7, the two projecting walls 139 are provided with vertically extending elongated openings 147 in the portion which overlaps the guide groove 146 of the operating pedal 140. The pin 142 fixed on the brake member 143 extends through the guide groove 146 of the operating pedal 140 and the elongated opening 147 in the rotary yoke 134.

Referring to FIG. 7, a shaft 149 is fixed between the two projecting walls 139 of the rotary yoke 134. The shaft 149 and the shaft 148 of the brake member 143 are interconnected by a spring 150 urging the pin 142 fixed on the brake member 143 to move vertically. That is, the pin 142 is constantly urged by the spring 150 to engage one of the engaging concave portions of the guide groove 146. When the pin 142 is engaged with one of the concave portions, the operating pedal 140 is held stopped in that position.

Figure 12:
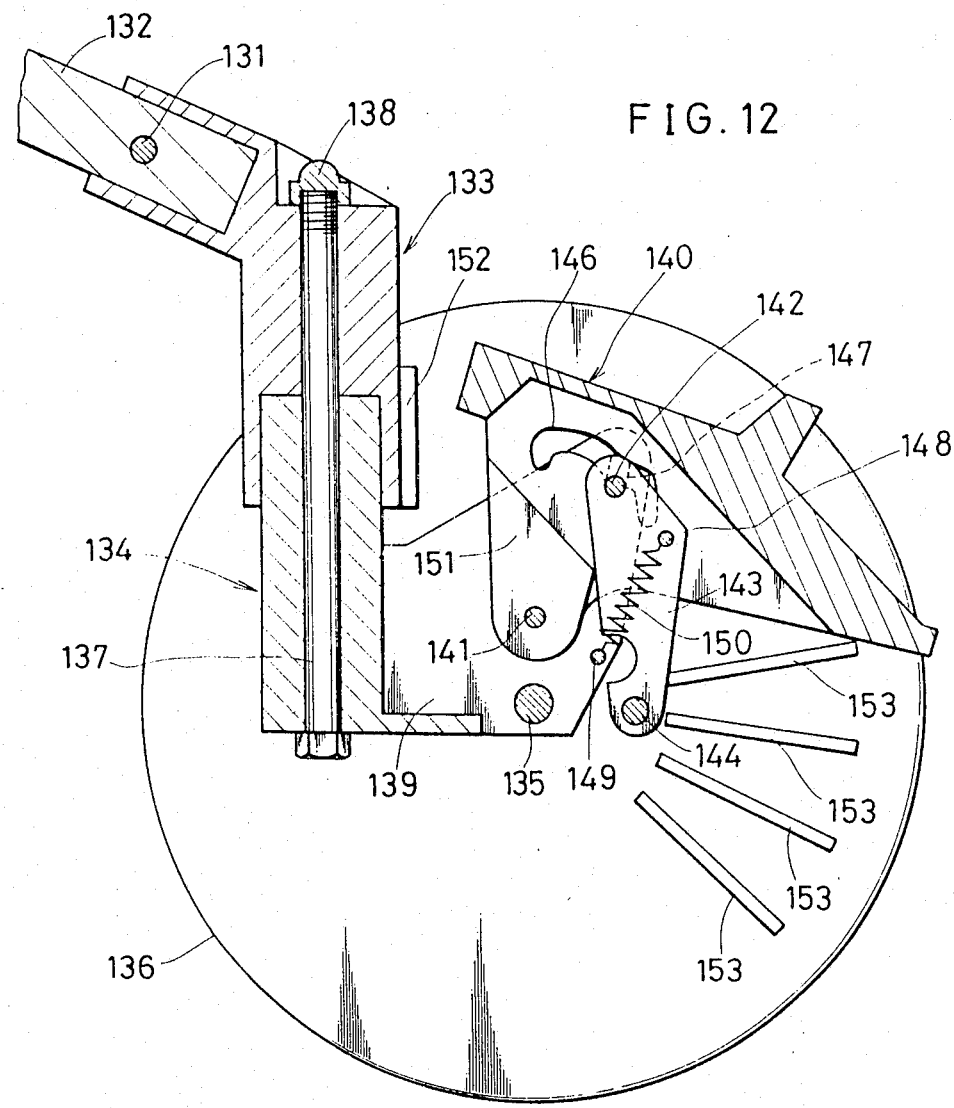
FIG. 12 is a sectional view showing the state of the operating pedal 140 brought to a second rotary position from the state shown in FIG. 7.

In this manner, the operating pedal 140 can be held in the third rotary position by the elongated opening 147, guide groove 146 and spring 150. FIG. 7 shows the operating pedal 140 held stopped at the first rotary position; FIG. 12 shows the operating pedal 140 held stopped at the second rotary position; and FIG. 13 shows the operating pedal 140 held stopped at the third rotary position.

Figure 11:
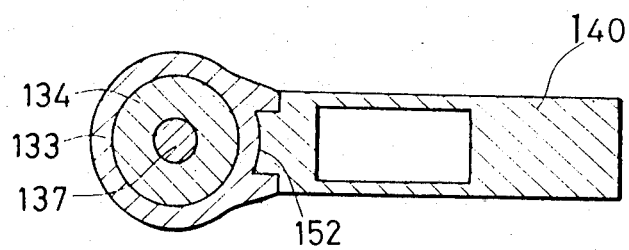
FIG. 11 is an end view taken along the line XI—XI in FIG. 7.

Referring to FIG. 11 showing an end view taken along the line XI—XI in FIG. 7, the fixed bracket 133 is formed with a concave portion 152 for receiving the front end of the operating pedal 140. As shown, when the concave portion 152 of the fixed bracket 133 is engaged with the operating pedal 140, the rotation of the rotary yoke 134 is inhibited, so that the caster 130 cannot swivel.

Figure 13:
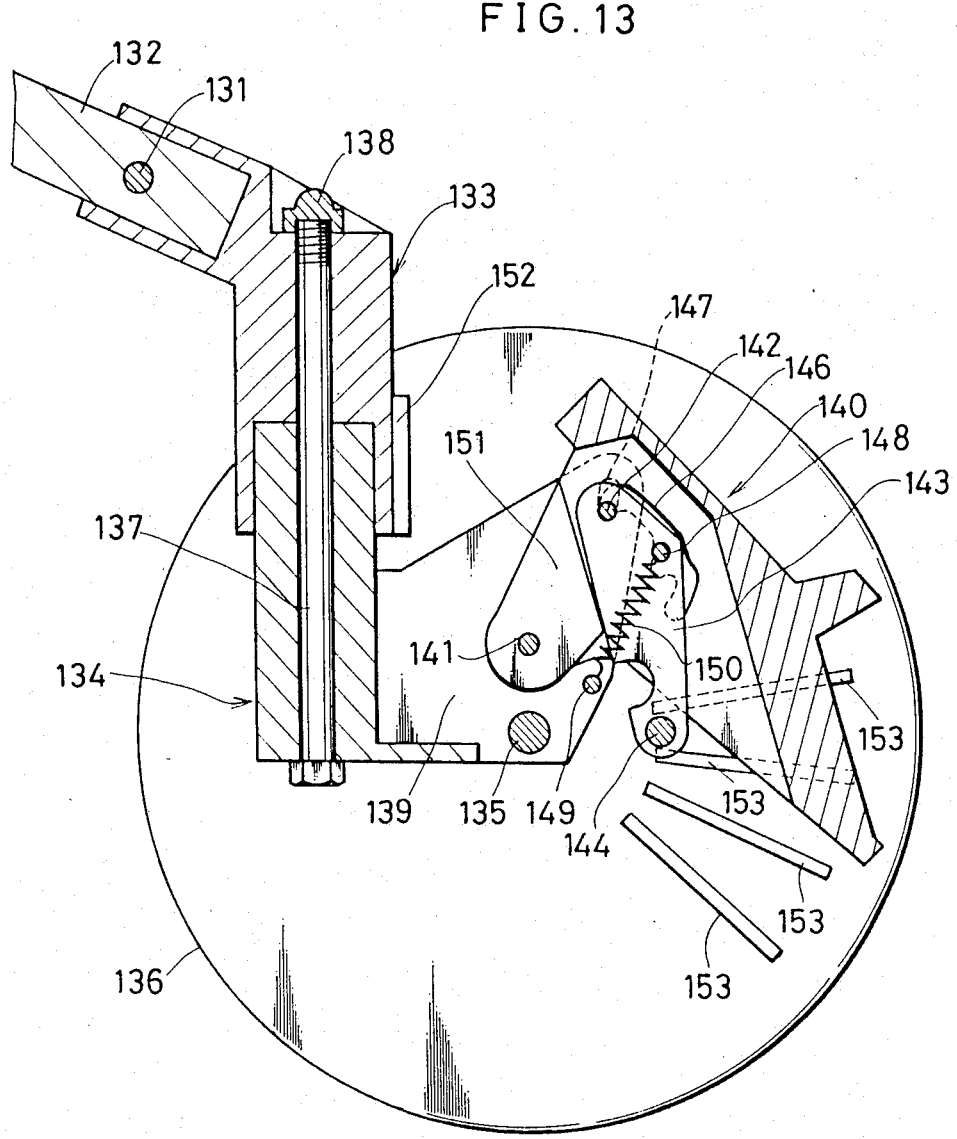
FIG. 13 is a sectional view showing the state of the operating pedal brought to a third rotary position from the state shown in FIG. 12.

Referring to FIGS. 7, 12 and 13, different states of the components will be described.

First, referring to FIG. 7, the state in which the operating peal 140 is in the first rotary position will be described. The baby carriage is being moved in the face-to-back push mode. That is, the axle 135 is positioned rearwardly of the rear leg 132 with respect to the direction of travel. The pin 142 fixed on the brake member 143 is engaged with the engaging concave portion 146c at the extreme right-hand end of the guide groove 146. This engaged state is firmly maintained by the action of the spring 150. In this state, the operating pedal 140 is engaged with the concave portion 152 of the fixed bracket 133, so that the rotation of the rotary yoke 134 is inhibited.

Next, the operator operates the operating pedal by hand or by foot to move it to the second rotary position shown in FIG. 12. With the rotation of the operating pedal 140, the pin 142 is upwardly moved along the guide groove 146 against the force of the spring 150 until it engages the concave portion 146b positioned at the middle. In this state, the concave portion 152 of the fixed bracket 133 is not engaged with the operating pedal 140. Therefore, the rotary yoke 134 is allowed to rotate relative to the fixed bracket 133 and the caster 130 is allowed to swivel.

As shown in FIG. 13, the operating pedal 140 is operated by hand or by foot so that it is moved to the third rotary position. The pin 142 is engaged with the engaging concave portion 146a positioned at the extreme left-hand end. With the rotation of the operating pedal 140, the abutment portions 151 of the operating pedal 140 displace the brake member 143. That is, in the state shown in FIG. 13, the brake rod 144 fixed on the brake member 143 fits between two spokes 153 of the wheel 136, thereby inhibiting the rotation of the wheel 146. As can be understood from the above, the abutment portions 151 of the operating pedal 140 is configured so that when the operating pedal 140 is brought to the third rotary position, it moves the brake member 143 to the position where the brake member 143 engages the wheel 136.

As described above, by turning the operating pedal 140 to the three rotary positions and holding it stopped there, it is possible to establish three states: the first state in which the rotation of the rotary yoke 134 is inhibited (FIG. 7), the second state in which the rotation of the rotary yoke 134 and wheel 136 is allowed (FIG. 12), and the third state in which the rotation of the wheel 136 is inhibited (FIG. 13).

The illustrated embodiments are examples of the invention only. Various modifications and changes are possible in the scope of the invention. For example, in the embodiment described above, the concave portion 152 has been provided as rotation inhibiting means adapted to engage the operating pedal 140 to inhibit the rotation of the rotary yoke 134. However, other forms or constructions can be employed. Further, in the above embodiment, the elongated opening 147, guide groove 146, pin 142 and spring 150 have been employed as the pedal holding means for holding the operating pedal 140 at three rotary positions. However, concerning the brake member for inhibiting the rotation of the wheel, other mechanisms may be used to hold the operating pedal at the three rotary positions. In brief, any form or construction may be used as the brake member provided that it is displaced in operative association with the rotation of the operating pedal and that when the operating pedal is in the third rotary position, it engages the wheel to inhibit its rotation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A caster comprising: a fixed bracket fixedly attached to a movable body to be moved on said caster, a rotary yoke supported on said fixed bracket for rotation around a vertical axis, a wheel rotatably supported on said rotary yoke by a horizontal axis at a position horizonally displaced from the axis of rotation of said rotary yoke, said rotary yoke including caster locking means for engaging said fixed bracket to inhibit the rotation of said rotary yoke, brake means for engaging said wheel to inhibit the rotation of said wheel, said brake means including a brake member and a brake rod carried by said brake member, said rotary yoke having a V-shaped guide groove for guiding said brake rod, said brake member having an elongated opening (51), said rotary yoke further having fixed thereon a shaft (52) which extends through said elongated opening in said brake member, and tension spring means for interconnecting said brake rod (53) and said shaft (52).

2. The caster as set forth in claim 1, wherein said movable body is a baby carriage.

3. The caster as set forth in claim 1, wherein said movable body is a baby carriage having a push rod adapted to be switched between a face-to-back push mode and a face-to-face push mode,
said casters being attached to the lower ends of a pair of front legs and the lower ends of a pair of rear legs of said baby carriage.

4. The caster as set forth in claim 1, wherein said caster locking means of said rotary yoke includes a caster locking member adapted to be operated by hand or by foot to be switched between two positions, said caster locking member being arranged so that when it is in one position it engages said fixed bracket to inhibit the rotation of said yoke, and wherein said brake member is adapted to be operated by hand or by foot to be switched between two positions, said brake member being arranged so that when it is in one position, it engages said wheel to inhibit the rotation of said wheel.

5. The caster as set forth in claim 1, wherein said caster locking member is rotatably attached at its lower end to said rotary yoke, said rotary yoke comprises a vertically extending elongated opening (44) in a yoke portion which overlaps said caster locking member (41), said caster locking member having an inverted V-shaped guide groove (43) in the portion which overlaps said elongated opening (44), a pin (45) extending through said elongated opening (44) and through said guide groove (43), said caster locking means further including a tension spring for constantly urging said pin (45) downwardly.

6. The caster as set forth in claim 1, wherein said caster locking member has a front end provided with an engaging convex portion, said fixed bracket having an engaging concave portion adapted to engage said engaging convex portion.

7. The caster as set forth in claim 1, wherein said brake rod is fixed to a lower end of said brake member, said brake rod extending in parallel with said horizontal axle, and wherein when said brake member is in a brake effective position, said brake rod engages spokes of said wheel to inhibit the rotation of said wheel.

8. A caster comprising:
a fixed bracket fixedly attached to a movable body to be moved on said caster,
a rotary yoke supported on said fixed bracket for rotation around a vertical axis,
a wheel rotatably supported on said rotary yoke by a horizontal axle,
an operating pedal rotatably attached to said rotary yoke,
pedal holding means for holding said operating pedal stopped at three rotary positions,
rotation inhibiting means installed on said fixed bracket for engaging said operating pedal to inhibit the rotation of said rotary yoke when said fixed bracket and said rotary yoke are in predetermined positional relationship and when said operating pedal is in the first rotary position,
a brake member installed on said rotary yoke and adapted to be displaced in operative association with the rotation of said operating pedal, said brake member engaging said wheel to inhibit its rotation when said operating pedal is in the third rotary position.

9. The caster as set forth in claim 8, wherein said rotation inhibiting means is a concave portion for receiving said operating pedal.

10. The caster as set forth in claim 8, wherein said pedal holding means comprises:
an elongated opening formed in the portion of said operating pedal which overlaps said elongated opening,
a guide groove formed in the portion of said operating pedal and having three engaging concave portions,
a pin inserted through said elongated opening and said guide groove, and
a spring urging said pin into one of the engaging concave portions of said guide groove.

11. The caster as set forth in claim 8, wherein said brake member includes a brake rod which engages spokes of said wheel to inhibit the rotation of said wheel.

12. The caster as set forth in claim 8, wherein:
said operating member is attached to said pin,
said operating pedal comprises abutment portions for abutting against said brake member to press the latter,
said abutment portions being configured so that when said operating pedal is brought to the third rotary position, the abutment portions move said brake member to the position where the brake member engages said wheel.

13. The caster as set forth in claim 8, wherein said movable body is a baby carriage.

14. The caster as set forth in claim 8, wherein said movable body is a baby carriage having a push rod adapted to be switched between a face-to-back push mode and the face-to-face push mode,
said casters being attached to the lower ends of a pair of front legs and the lower ends of a pair of rear legs of said baby carriage.

* * * * *